United States Patent
Jander et al.

(10) Patent No.: US 8,731,402 B2
(45) Date of Patent: May 20, 2014

(54) ORTHOGONALLY-COMBINING WAVELENGTH SELECTIVE SWITCH MULTIPLEXER AND SYSTEMS AND METHODS USING SAME

(75) Inventors: Ralph Brian Jander, Freehold, NJ (US); Yan Jiang, Manalapan, NJ (US)

(73) Assignee: Tyco Electronics Subsea Communications LLC, Eatontown, NJ (US)

(*) Notice: Subject to any disclaimer, the term of this patent is extended or adjusted under 35 U.S.C. 154(b) by 575 days.

(21) Appl. No.: 12/902,698

(22) Filed: Oct. 12, 2010

(65) Prior Publication Data

US 2012/0087657 A1    Apr. 12, 2012

(51) Int. Cl.
*H04J 14/00* (2006.01)
*H04J 14/06* (2006.01)
*H04J 14/02* (2006.01)
*H04B 10/00* (2013.01)

(52) U.S. Cl.
USPC ............. 398/48; 398/46; 398/65; 398/89; 398/152

(58) Field of Classification Search
USPC .................. 398/46, 152, 48, 65, 89
See application file for complete search history.

(56) References Cited

U.S. PATENT DOCUMENTS

| | | | | |
|---|---|---|---|---|
| 6,134,033 A * | 10/2000 | Bergano et al. | ............... | 398/184 |
| 6,208,442 B1 * | 3/2001 | Liu et al. | ............... | 398/9 |
| 6,611,340 B2 * | 8/2003 | Gu | ............... | 356/491 |
| 8,260,141 B2 * | 9/2012 | Berg | ............... | 398/91 |
| 8,295,703 B2 * | 10/2012 | Miura et al. | ............... | 398/83 |
| 2001/0048556 A1 * | 12/2001 | Ranalli et al. | ............... | 359/497 |
| 2002/0163691 A1 * | 11/2002 | Wong et al. | ............... | 359/127 |
| 2003/0095733 A1 * | 5/2003 | Lin | ............... | 385/11 |
| 2003/0128986 A1 * | 7/2003 | Tai et al. | ............... | 398/84 |
| 2003/0137927 A1 * | 7/2003 | Sato | ............... | 370/203 |
| 2003/0161629 A1 * | 8/2003 | Frascolla et al. | ............... | 398/5 |
| 2005/0058462 A1 * | 3/2005 | Talebpour et al. | ............... | 398/199 |
| 2006/0109875 A1 * | 5/2006 | Matsushita et al. | ............... | 372/29.02 |
| 2007/0201869 A1 * | 8/2007 | Weston-Dawkes et al. | ............... | 398/45 |
| 2007/0274728 A1 * | 11/2007 | Bergano et al. | ............... | 398/152 |
| 2009/0129775 A1 * | 5/2009 | Handelman | ............... | 398/47 |
| 2009/0324243 A1 * | 12/2009 | Neilson | ............... | 398/154 |
| 2010/0322627 A1 * | 12/2010 | Desbruslais et al. | ............... | 398/65 |

* cited by examiner

*Primary Examiner* — Ken Vandrpuye
*Assistant Examiner* — Abbas H Alagheband

(57) ABSTRACT

In general, a wavelength division multiplexed (WDM) communication system may use wavelength selective switching to simultaneously pre-filter and combine groups of channel wavelengths with orthogonal polarizations to provide a pre-filtered, pair-wise orthogonal aggregate WDM optical signal. An orthogonally-combining wavelength selective switch (WSS) multiplexer may route channel wavelengths individually from different sets of channels to a common output. The orthogonally-combining WSS multiplexer may also provide substantially orthogonal polarizations for the wavelengths in the different sets of channels. The different sets of channels may include odd channels and even channels.

10 Claims, 4 Drawing Sheets

ORTHOGONALLY-COMBINING WAVELENGTH SELECTIVE SWITCH MULTIPLEXER AND SYSTEMS AND METHODS USING SAME

TECHNICAL FIELD

The present application relates to the optical transmission of information and more particularly, to an orthogonally-combining wavelength selective switch multiplexer for use in an optical communication system and method.

BACKGROUND

Optical communication systems employ wavelength combining techniques known as wavelength division multiplexing (WDM) to multiplex many transmission channels onto a single-mode fiber. Non-linear transmission effects in optical fibers, however, may cause interactions between adjacent optical channels, which limit performance of such systems. One way to reduce these cross-channel interactions is by multiplexing the channel wavelengths such that the adjacent frequencies in the channel spectrum propagate along the transmission fiber with orthogonal states of polarization. To launch orthogonal WDM signals, existing systems often use polarization maintaining (PM) components or use complex polarization control techniques when PM components are not commercially available or viable. As PM components become more available, such components enable practical implementations of orthogonal launch of WDM signals without complex polarization control.

Other techniques may also be used to avoid crosstalk penalty in dense wavelength division multiplexed (DWDM) systems having high spectral efficiencies. One such technique involves pre-filtering the individual data spectra prior to multiplexing the channel wavelengths onto a transmission fiber. In orthogonally launched DWDM systems, however, providing both pre-filtering and orthogonal launch presents unique challenges particularly when PM components are used. Using separate PM comb filters to pre-filter the separate groups of wavelengths to be orthogonally combined, for example, may degrade system performance because of difficulties aligning the frequency and pass-band shape of multiple PM comb filters on the transmit side and a deinterleaver on the receive side to the data channels. These problems associated with controlling the filter shapes and center frequency alignment are compounded in systems with several groups or bands of wavelengths being multiplexed together and thus having many filters. Moreover, using additional PM components may degrade system performance because of the polarization crosstalk effect that results within PM devices and connectors from the stress in the ferrules and arrays that hold PM fibers inside of PM devices.

BRIEF DESCRIPTION OF THE DRAWINGS

Reference should be made to the following detailed description which should be read in conjunction with the following figures, wherein like numerals represent like parts.

DETAILED DESCRIPTION

In general, a wavelength division multiplexed (WDM) communication system, consistent with embodiments describe herein, may use wavelength selective switching to simultaneously pre-filter and combine groups of channel wavelengths with orthogonal polarizations to provide a pre-filtered, pair-wise orthogonal aggregate WDM optical signal. An orthogonally-combining wavelength selective switch (WSS) multiplexer may route channel wavelengths individually from different sets of channels to a common output. The orthogonally-combining WSS multiplexer may also provide substantially orthogonal polarizations for the wavelengths in the different sets of channels. The different sets of channels may include odd channels and even channels.

As used herein, substantially orthogonal polarization refers to an angle between polarization states of about 90°, which may include an acceptable deviation with negligible impact on performance of the WDM system. In one example, the angle between polarization states may be sufficiently close to 90° to provide a polarization extinction ratio associated with the pair-wise orthogonal WDM optical signal of less than about −18 dB (e.g., an angle of 90°±7°. As used herein, "wavelength selective switching" refers to switching optical signals to one or more outputs on a per-wavelength basis. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

Figure 1:
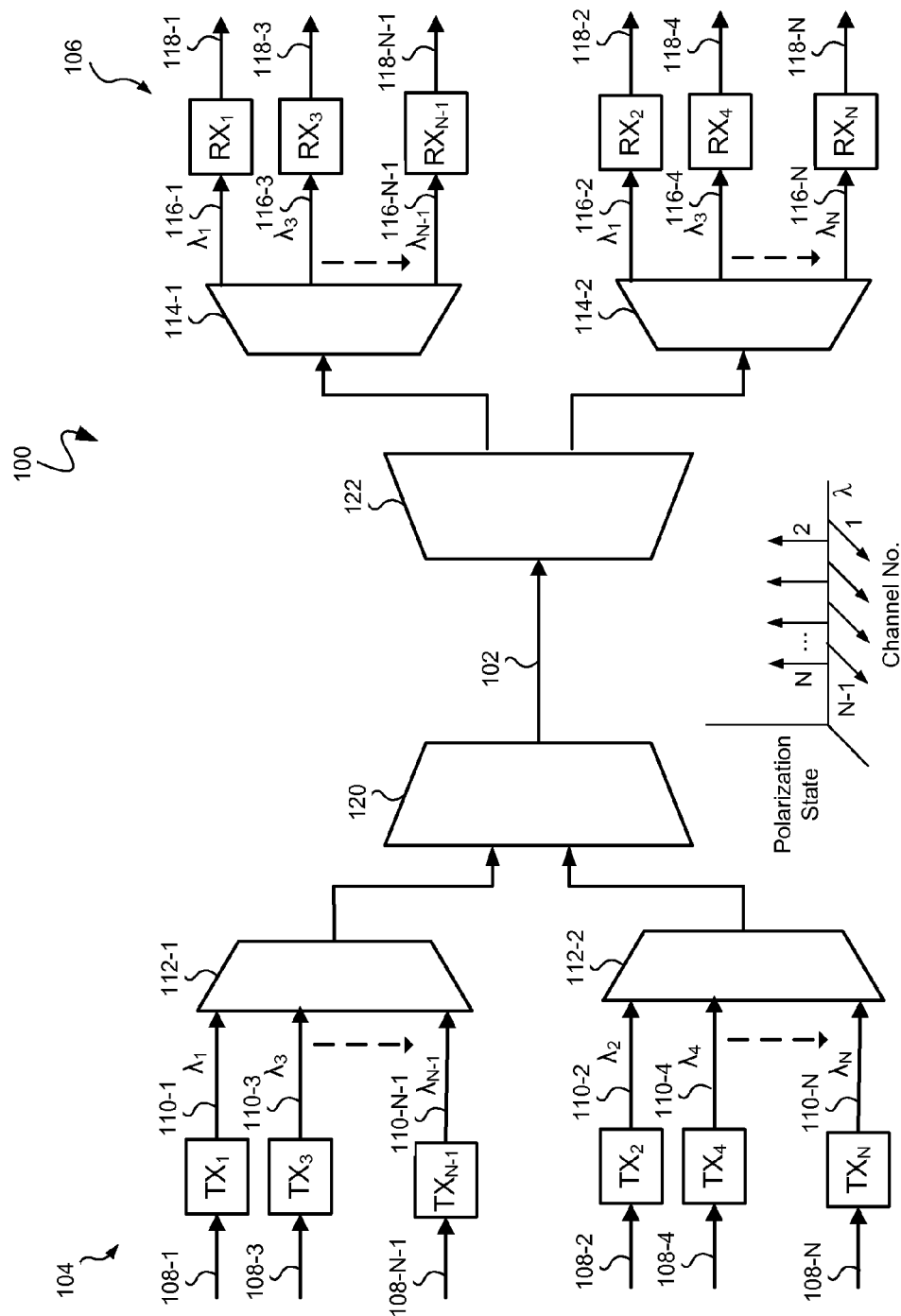
FIG. 1 is a simplified block diagram of one exemplary embodiment of a wavelength division multiplexed (WDM) communication system consistent with the present disclosure.

FIG. 1 is a simplified block diagram of one exemplary embodiment of a WDM communication system 100, consistent with the present disclosure, which uses wavelength selective switching to simultaneously pre-filter and combine first and second sets of channels with substantially orthogonal polarizations. The communication system 100 serves to transmit a plurality of optical channels over an optical path 102 from a transmitting terminal 104 to one or more remotely located receiving terminals 106. The optical channels (1, 2, ... N) may be established based on a plurality of corresponding optical carrier wavelengths ($\lambda_1, \lambda_2 \ldots \lambda_N$) such that each channel has a spectral width centered on the respective carrier wavelength (or frequency). As used herein, channel wavelengths refer to the wavelengths associated with the respective channels and may include a band of wavelengths centered on the carrier wavelength associate with a channel. For example, odd channel wavelengths may include the bands of wavelengths associated with odd channels (1, 3, ... N−1) and even channel wavelengths may include the bands of wavelengths associated with even channels (2, 4, ... N). Although the exemplary embodiments described herein refer to odd and even channels, other groupings of channels (with corresponding sets of channel wavelengths) may be possible with transmitters, receivers, multiplexers, demultiplexers and other components configured for those other groupings of channels.

In the exemplary embodiment, the WDM communication system 100 is a dense wavelength division multiplexed (DWDM) system having high spectral efficiencies, i.e., where the spectral width of constituent wavelength (frequency) carriers is larger than the actual frequency spacing among constituents. In exemplary embodiments, the channels (1, 2, . . . N) may have a spacing of 33 GHz or 25 GHz and the spectral efficiency may be 0.6 bit/s/Hz or 0.8 bit/s/Hz. The systems and methods described herein may also have narrower channel spacings and higher spectral efficiency.

The exemplary system 100 may be a long-haul submarine system configured for transmitting the channels from a transmitter to a receiver, for example, at a distance of 5,000 km, or more. An orthogonally-combining WSS multiplexer, consistent with the present disclosure, may also be used in other systems such as terrestrial systems configured for transmitting from a transmitter to a receiver, for example, at distances in a range of about 2,000 km to 3,000 km.

Those skilled in the art will recognize that the communication system 100 has been depicted as a highly simplified point-to-point system for ease of explanation. For example, the transmitting terminal 104 and receiving terminal 106 may both be configured as transceivers or transponders, whereby each may be configured to perform both transmitting and receiving functions. For ease of explanation, however, the terminals are depicted and described herein with respect to only a transmitting or receiving function. The orthogonally-combining WSS multiplexer consistent with the disclosure may be incorporated into a wide variety of network components and configurations. The illustrated exemplary embodiments herein are provided only by way of explanation, not of limitation.

In the illustrated exemplary embodiment, a plurality of odd channel transmitters $TX_1, TX_3 \ldots TX_{N-1}$ receive data on respective data paths 108-1, 108-3 . . . 108-N–1 and transmit respective optical signals by modulating the data on respective optical carrier wavelengths $\lambda_1, \lambda_3 \ldots \lambda_{N-1}$ associated with odd numbered channels (i.e., 1, 3, . . . N–1). Data may be modulated on the odd channel wavelengths $\lambda_1, \lambda_3 \ldots \lambda_N$ using various modulation formats such as a differential phase shift keying (DPSK) modulation format, e.g. a RZ-DPSK or CRZ-DPSK format. Similarly, each of a plurality of even channel transmitters $TX_2, TX_4 \ldots TX_N$ receive data on respective data paths 108-2, 108-4 . . . 108-N and transmit respective optical signals by modulating the data on optical carrier wavelengths $\lambda_2, \lambda_4 \ldots \lambda_N$ associated with even numbered channels (i.e., 2, 4, . . . N). The transmitters are shown in highly simplified form for ease of explanation. Each transmitter may include electrical and optical components configured for transmitting the optical signal at its associated wavelength with a desired amplitude and modulation.

The transmitted odd channel wavelengths are respectively carried on a plurality of optical paths 110-1, 110-3 . . . 110-N–1 and the even channel wavelengths are respectively carried on a plurality of optical paths 110-2, 110-4 . . . 110-N. In one embodiment, the transmitters $TX_1, TX_2, \ldots TX_N$ impart a large degree of polarization to the optical signals and the optical paths 110-1 to 110-N include polarization maintaining (PM) fibers. PM fibers maintain the polarization of the optical signals launched into the fibers such that the light propagates primarily along one of the two principal axes of the PM fiber (e.g., the slow axis). Thus, the optical signals propagate in the PM fibers with a predominantly single polarization state. Examples of PM fibers include panda style PM fibers and bow-tie style PM fibers.

An odd channel multiplexer 112-1 combines the odd channel wavelengths and an even channel multiplexer 112-2 combines the even channel wavelengths. The transmitted optical signals modulated on the odd channel wavelengths are thus combined to form an aggregate odd channel optical signal and the transmitted optical signals modulated on the even channel optical wavelengths are combined to form an aggregate even channel optical signal. In one exemplary embodiment, the channel spacing between the combined odd channels may be 66.6 Hz or 50 Hz and the channel spacing between the combined even channels may be 66.6 Hz or 50 Hz. In the exemplary embodiment, the multiplexers 112-1, 112-2 (also referred to as combiners) are PM multiplexers that also maintain the polarization of the optical signals as they are combined. One example of PM optical multiplexers or combiners includes arrayed waveguide grating (AWG) devices. The multiplexers 112-1, 112-2 may also be implemented using an n>1 polarization maintaining WSS with similar spectral properties as an AWG. Using an n×1 PM WSS instead of an AWG may avoid the need for many AWG codes supporting dedicated wavelength ranges to support the various LTE bands. The PM devices used in the system may maintain a relatively high polarization extinction ratio (e.g., greater than 18 dB).

An orthogonally-combining WSS multiplexer 120 then simultaneously pre-filters and combines the aggregate signal of odd channel wavelengths and the aggregate signal of even channel wavelengths with substantially orthogonal polarizations to provide a pre-filtered, pair-wise orthogonal aggregate WDM signal on the optical path 102. The orthogonally-combining WSS multiplexer 120 may include wavelength selective switching technology capable of spectrally filtering the transmit spectrum associated with each of the channels. The orthogonally-combining WSS multiplexer 120 may also include polarization optics capable of providing the substantially orthogonal polarizations. The orthogonally-combining WSS multiplexer 120 may further adjust the power of each channel as the channel wavelengths are individually routed to provide per channel power pre-emphasis.

In another embodiment, the wavelength selective switching may be performed in the multiplexers 112-1, 112-2 instead of in the multiplexer 120. The multiplexers 112-1, 112-2 may include n×1 polarization maintaining WSS devices that provide the desired pre-filtering and power pre-emphasis for the odd and even channel wavelengths. Thus, the PM aggregate odd channel optical signal output from the odd channel multiplexer 112-1 may be pre-filtered with a first polarization and the PM aggregate even channel optical signal output from the even channel multiplexer 112-2 may be pre-filtered with a second polarization substantially orthogonal to the first polarization. In this embodiment, the aggregate odd and even channel optical signals may then be combined with a PM beamcombiner.

Figure 1A:
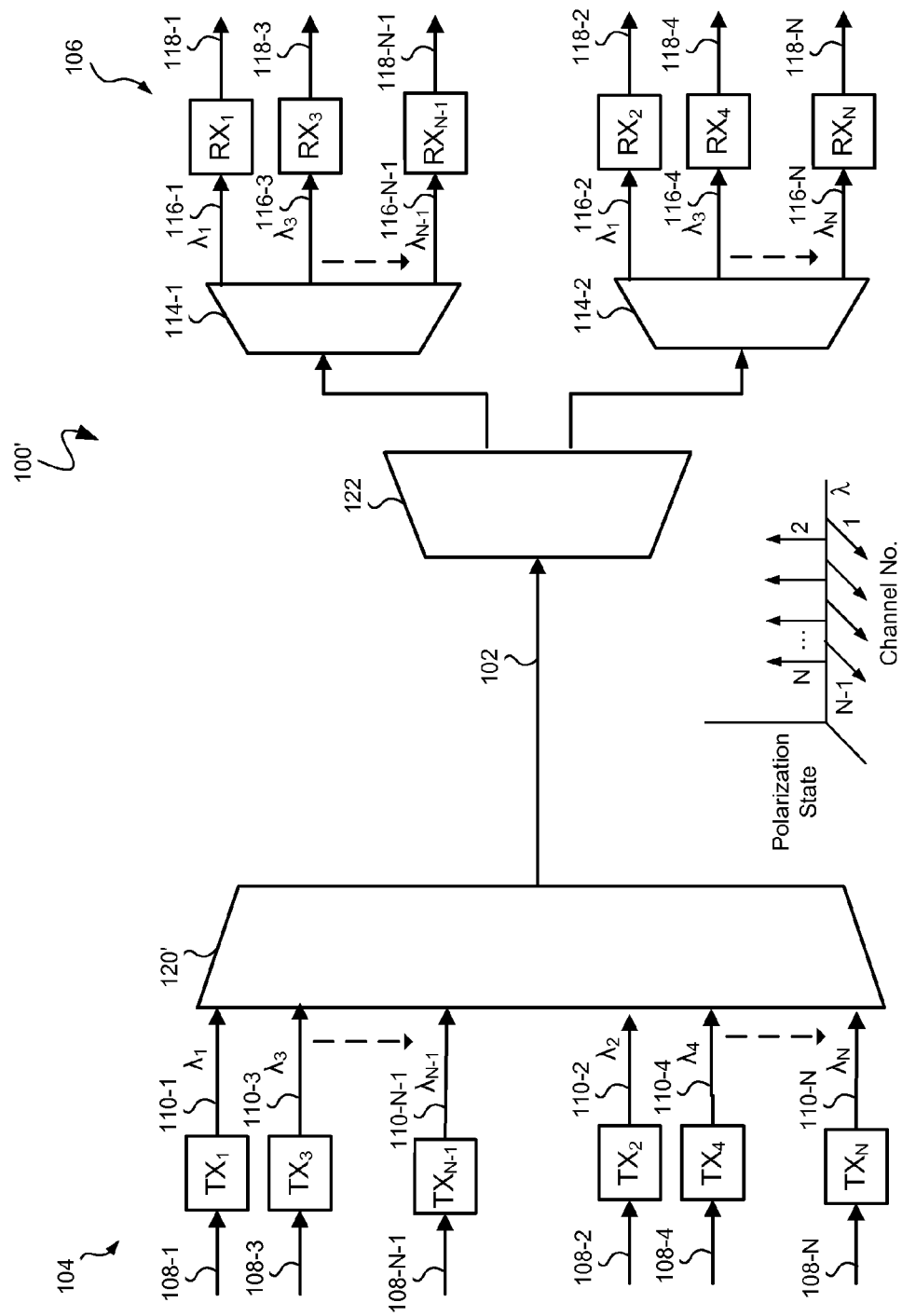
FIG. 1A is a simplified block diagram of another exemplary embodiment of a WDM communication system consistent with the present disclosure.

In a further embodiment, shown in FIG. 1A, an orthogonally-combining WSS multiplexer 120' may incorporate the odd and even channel multiplexing by using a 2n×1 polarization maintaining WSS. The orthogonally-combining WSS multiplexer 120' receives the odd and even channel wavelengths on separate PM inputs, provides the spectral filtering and pre-emphasis, and provides PM combining to produce the pre-filtered, pair-wise orthogonal aggregate WDM signal on the optical path 102.

The pre-filtered, pair-wise orthogonal aggregate WDM signal may then be launched onto optical path 102. The optical path 102 may include optical fibers, waveguides, optical amplifiers, optical filters, dispersion compensating modules, and other active and passive components.

The pair-wise orthogonal aggregate WDM signal may be received at one or more remote receiving terminals 106. The receiving terminal 106 may include a demultiplexer 122, such as a deinterleaver, that splits the WDM signal into an aggregate optical signal including odd channel wavelengths and an aggregate optical signal including even channel wavelengths. The demultiplexer 122 on the receive side may include interleaver optics, such as Gires-Tournois (GT) interleaver optics, with a pass-band shape and frequency alignment that substantially matches that of the orthogonally-combining WSS multiplexer 120 on the transmit side. Thus, the demultiplexer 122 on the receive side may also filter the individual carrier spectra as the pair-wise orthogonal aggregate WDM signal is split to provide crosstalk rejection. The demultiplexer 122 may also be implemented as a 1×2 WSS with spectral filtering similar to a deinterleaver. The demultiplexer 122 may further include a broadband coupler to separate the groups of odd and even channel wavelengths.

An odd channel demultiplexer 114-1 separates the transmitted odd channels at odd channel wavelengths $\lambda_1, \lambda_3 \ldots \lambda_N$ onto associated paths 116-1, 116-3 . . . 116-N coupled to associated odd channel receivers $RX_1, RX_3 \ldots RX_{N-1}$. An even channel demultiplexer 114-2 separates the transmitted even channels at even channel wavelengths $\lambda_2, \lambda_4 \ldots \lambda_N$ onto associated paths 116-2, 116-4 . . . 116-N coupled to associated even channel receivers $RX_2, RX_4 \ldots RX_N$. One example of the demultiplexers 114-1, 114-2 includes arrayed waveguide grating (AWG) devices. The demultiplexers 114-1, 114-2 may also be implemented using an n×1 polarization WSS with similar spectral properties as an AWG. The receivers $RX_1, RX_2 \ldots RX_N$ may be configured to demodulate the optical signals on the separated channels and provide associated output data signals on respective output data paths 118-1, 118-2 . . . 118-N. Each receiver may include electrical and optical components configured for receiving and demodulating the optical signal at its associated wavelength.

Figure 2:
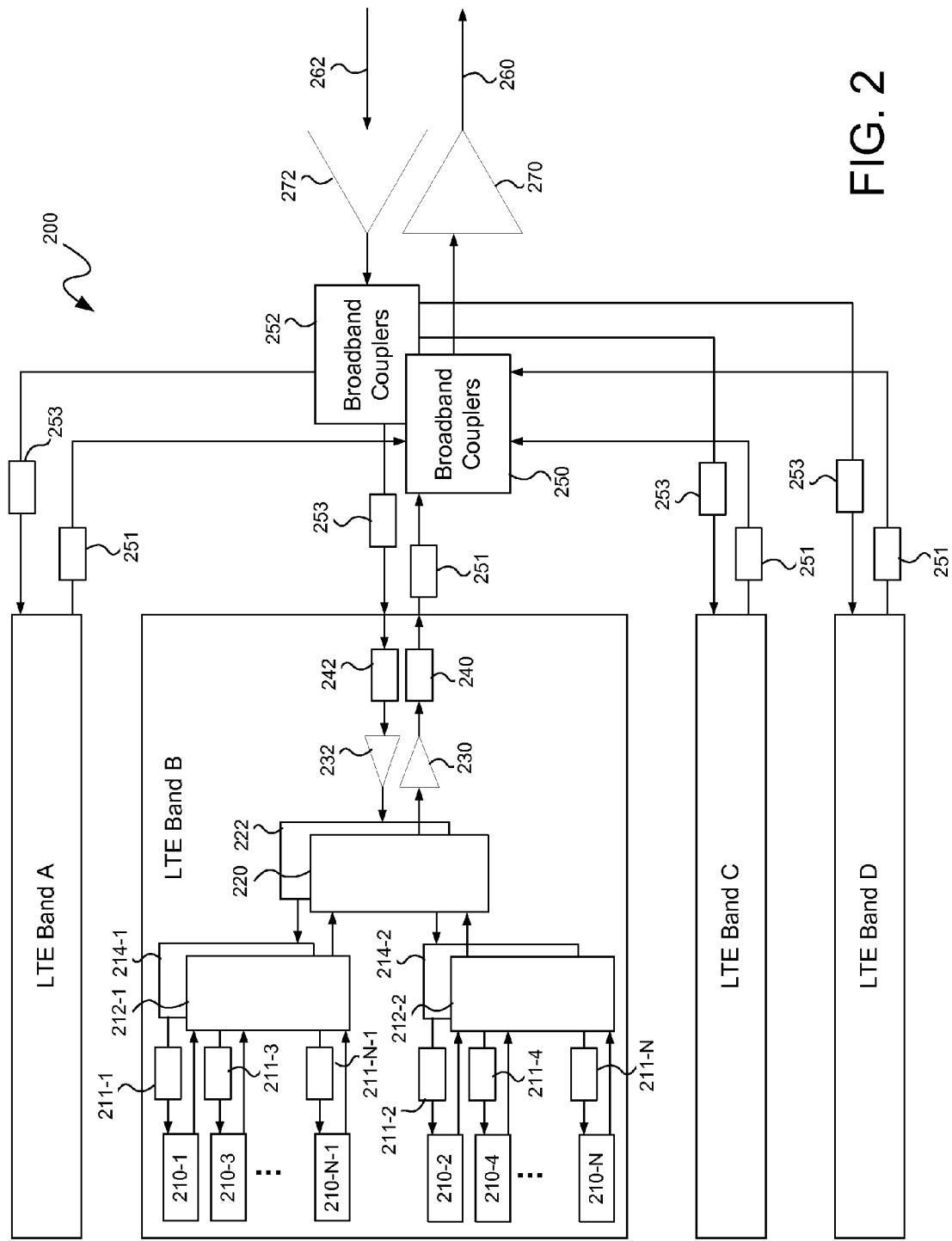
FIG. 2 is a simplified block diagram of one exemplary embodiment of line terminating equipment (LTE) consistent with the present disclosure.

FIG. 2 is a simplified block diagram of exemplary line terminating equipment (LTE) 200, consistent with the present disclosure, which uses wavelength selective switching to simultaneously pre-filter and combine first and second sets of channel wavelengths with substantially orthogonal polarizations. In general, the LTE 200 includes equipment for both transmitting and receiving WDM signals. In one embodiment, the first and second sets of channel wavelengths are odd and even channel wavelengths. In particular, the LTE 200 includes odd channel transponders 210-1, 210-3 . . . 210-N-1 and even channel transponders 210-2, 210-4 . . . 210-N, which combine the transmitter and receiver functionality. The transponders may be grouped together in bands (e.g., shown as LTE Band A to LTE Band D). In one example, each band provides 32 channels—16 odd channels and 16 even channels. The number of LTE bands may range from, for example, 1 to 6, depending upon the desired system bandwidth (i.e., channel capacity) and channel spacing.

The LTE 200 provides wavelength division multiplexing and demultiplexing of the channel wavelengths associated with the transponders in each band. On the transmit side, an odd channel wavelength multiplexer 212-1 (or combiner) and an even channel wavelength multiplexer 212-2 (or combiner) receive optical signals from the transponders and combine the odd channel wavelengths and the even channel wavelengths, respectively, to provide aggregate optical signals. On the receive side, an odd channel wavelength demultiplexer 214-1 and an even channel wavelength demultiplexer 214-2 separate the odd channel wavelengths and the even channel wavelengths, respectively, for processing the odd channel and even channel optical signals in the transponders. The multiplexers 212-1, 212-2 and demultiplexers 214-1, 214-2 may include AWG or WSS devices such as 16×1 AWG or 16×1 WSS devices to provide multiplexing and/or demultiplexing for 16 channels. Tunable dispersion compensation (TDC) devices 211-1, 211-2 . . . 211-N may also be located in the receive paths before the receiver portion of each of the transponders to provide per channel dispersion compensation. The TDC devices 211-1 to 211-N may be eliminated in other embodiments, for example, where minimal dispersion compensation is required. Polarization maintaining (PM) TDC devices may also be included on the transmit paths after the transmitter portion of each of the transponders.

The LTE 200 further combines and separates the group of odd channel wavelengths and the group of even channel wavelengths. On the transmit side, an orthogonally-combining WSS multiplexer 220 simultaneously pre-filters and combines the aggregate odd channel signal and the aggregate even channel signal with substantially orthogonal polarization to provide a pre-filtered, pair-wise orthogonal aggregate WDM signal. The orthogonally-combining WSS multiplexer 220 may include WSS optics, polarization optics, and power adjusting optics, for example, as described in greater detail below. On the receive side, the LTE 200 may include a demultiplexer 222, such as a deinterleaver, to separate the odd channel wavelengths from the even channel wavelengths. The transmit side and receive side within each band of the LTE 200 may further include terminal line amplifiers 230, 232 and bulk dispersion compensation equipment 240, 242.

The LTE 200 may further include broadband optical couplers 250, 252 for combining the aggregate WDM signals associated with each band for transmission over an optical path 260 and for separating the WDM signal received on an optical path 262 into aggregate WDM signals associated with each band. The LTE 200 may further include group filters 251, 253 to reduce noise and terminal line amplifiers (TLA) 270, 272 for amplifying the WDM signal before transmission over the optical path 260 and for amplifying the WDM signal received on the optical path 262. In other embodiments, a WSS band aggregator and deaggregator may be used instead of the broadband optical couplers and filters, for example, as described in U.S. Pat. application Ser. No. 12/902,740, filed concurrently herewith on Oct. 12, 2010, and incorporated herein by reference.

Figure 3:
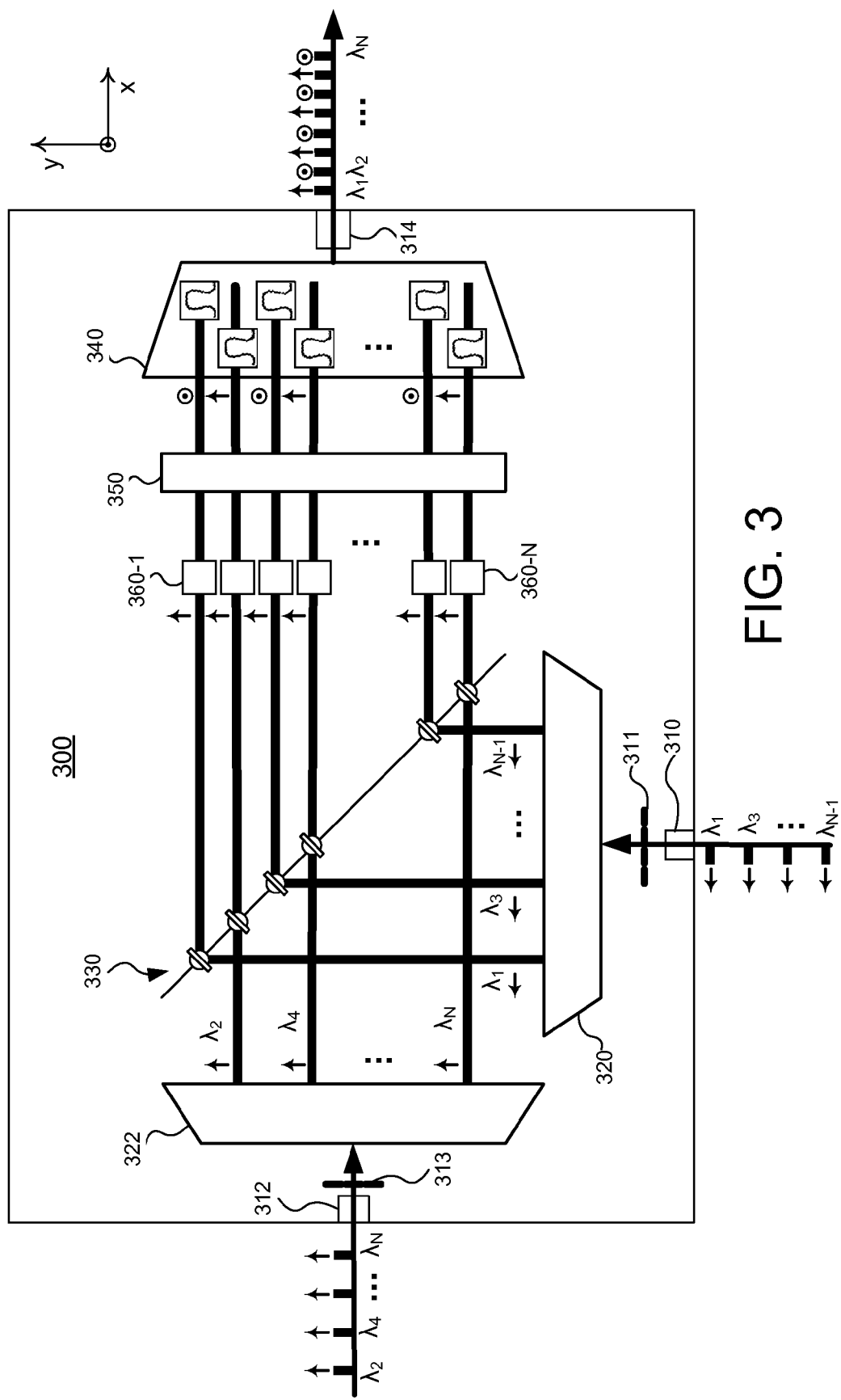
FIG. 3 is a simplified block diagram of one exemplary embodiment of an orthogonally-combining wavelength selective switch multiplexer consistent with the present disclosure.

Referring to FIG. 3, one embodiment of a 2×1 orthogonally-combining WSS multiplexer 300 is shown and described in greater detail. The orthogonally-combining WSS multiplexer 300 may be based on a 1×2 WSS including first and second optical inputs 310, 312 that receive combined odd channel wavelengths and combined even channel wavelengths, respectively, and a common optical output 314 that provides the pre-filtered, pair-wise orthogonal aggregate WDM signal. Although the exemplary embodiment is described and shown with the optical inputs 310, 312 assigned to odd channels and even channels, respectively, the optical input 310 may receive the even channel wavelengths and the optical input 320 may receive the odd channel wavelengths. Also, the optical inputs 310, 312 may receive different sets of channel wavelengths having other groupings (e.g., other than odd and even).

The WSS multiplexer 300 includes wavelength demultiplexers 320, 322 that separate the combined odd channel wavelengths and combined even channel wavelengths, respectively, into the constituent odd channel wavelengths and even channel wavelengths. The wavelength demultiplexers 320, 322 may include dispersive devices or gratings, such as arrayed waveguide gratings (AWGs), which spatially divert the constituent wavelengths. A switching fabric 330 routes or steers the separated, individual wavelengths to a wavelength multiplexer 340, such as a narrow band wavelength multiplexer, which combines the routed wavelengths onto the common output 314. The switching fabric 330 may use various technologies to provide the switching including, without limitation, liquid crystal on silicon (LCOS) and digital light processing (DLP). The pre-filter wavelength pass band of the WSS multiplexer 300 may be substantially similar to the narrowest filter (e.g., a deinterleaver) used on the receive side in front of the receiver. The wavelength provisioning in the WSS multiplexer 300 may be dynamic and may be controlled through a digital communication interface (not shown).

The optical inputs 310, 312 may include fiber collimators coupled to polarization maintaining (PM) input fibers with light (i.e., channel wavelengths) traveling predominantly along one axis (e.g., along a slow axis). The common output 314 may also include a collimator coupled to a PM output fiber. The fiber collimators may be rotationally oriented to align the axis along which the light is traveling to a desired direction relative to the WSS optics. In the illustrated embodiment, for example, the odd channel wavelengths and the even channel wavelengths have a substantially parallel polarization (e.g., parallel to the X-Y plane) upon entering the WSS multiplexer 300.

Input polarizers 311, 313 may also be used for increasing the extinction ratio of the polarized light within the WSS multiplexer 300 (e.g., an extinction ratio of greater than 30 dB). In one embodiment where light propagates predominantly along the slow axis of the PM input fibers, for example, the input polarizers 311, 313 are aligned with the slow axis of the respective PM input fibers to remove unwanted power in the fast axis. In other embodiments, the light may be propagating predominantly along another axis (e.g., the fast axis) of the PM input fibers and the input polarizers may be aligned with that axis. In the illustrated embodiment, the input polarizers 311, 313 are located after the collimators in the optical inputs 310, 312. Using input polarizers 311, 313 after the collimators may be advantageous to overcome extinction ratio degrading problems that may occur within the collimators (e.g., from a poor splice or from stress effects within the collimator subassemblies). In other embodiments, in-line polarizers (not shown) may be spliced into the PM input fibers. Using in-line polarizers may be advantageous when the space is limited within the WSS multiplexer 300.

The orthogonally-combining WSS multiplexer 300 changes the polarization state of the light (i.e., channel wavelengths) received on one input relative to the other input. In the illustrated embodiment, for example, the polarization state of the odd channel wavelengths received on the first input 310 is rotated by about 90° (e.g., perpendicular to the X-Y plane). In one embodiment, the orthogonally-combining WSS multiplexer 300 includes polarization optics 350, such as polarization diversity optics or a polarization rotator, which provide a translation of the polarization state by 90°. The orthogonally-combining WSS multiplexer 300 may also change the polarization state of the even channel wavelengths received on the second input 312. Although the illustrated embodiment shows the polarization optics 350 changing the polarization state after the switching fabric 330, the orthogonally-combining WSS multiplexer 300 may also change the polarization state before the switching fabric 330, for example, by locating the polarization optics 350 before the switching fabric 350. In another embodiment, a polarization rotator, such as a wave plate, may be located before one or both of the wavelength demultiplexers 320, 322 to rotate the polarization before the wavelengths are separated.

Other techniques may also be used to change the polarization state of one set of channel wavelengths relative to the other set of channel wavelengths within the orthogonally-combining WSS multiplexer 300. Orthogonal polarization between odd and even wavelengths may be achieved at the optical inputs 310, 312, for example, by rotating the PM fibers about 90° relative to each other. For example, the slow axis of the PM input fiber coupled to input 310 may be substantially perpendicular to the x-y plane and the slow axis of the PM input fiber 312 may be substantially parallel to the x-y plane. The light that is propagating along the slow axes of the respective PM input fibers will thus be substantially orthogonal after exiting the PM input fibers and entering the WSS multiplexer 300. Providing the orthogonal polarization by rotating one of the PM input fibers may be advantageous when the space within the orthogonally-combining WSS multiplexer 300 is limited and/or when deterioration (e.g., insertion loss) may be caused by using other devices to change the polarization.

The WSS multiplexer 300 may further include variable optical attenuators 360-1 to 360-N for each of the constituent wavelengths to provide per channel power adjustments. The variable optical attenuators 360-1 to 360-N allow power adjustments of the individual channels, for example, to provide power pre-emphasis across the spectrum of wavelengths combined on the common output 314. Providing the per-channel power adjustment within the WSS multiplexer 300 avoids having to use variable optical attenuators in the individual transponders. In one example, the WSS multiplexer 300 may be capable of providing ~20 dB of pre-emphasis.

In another embodiment, the WSS multiplexer 300 may be based on a 2n×1 WSS with separate inputs for each of the odd channel wavelengths and the even channel wavelengths. In this embodiment, the functions of the odd and the even channel wavelength multiplexers may be incorporated into the WSS multiplexer 300.

Accordingly, the orthogonally-combining WSS multiplexer, consistent with the embodiments described herein, uses wavelength selective switching to simultaneously pre-filter and combine sets of channel wavelengths with an orthogonal polarization and provides optional per-channel power pre-emphasis, thereby reducing channel crosstalk in a high spectral efficiency WDM communication system while also reducing the number of PM components and filters in the system.

Consistent with one embodiment, an orthogonally-combining WSS multiplexer includes: first and second optical input ports configured to receive first and second sets of multiplexed wavelengths; first and second wavelength demultiplexers configured to demultiplex the first and second sets of multiplexed wavelengths, respectively; a switch fabric configured to selectively route wavelengths demultiplexed from the first and second sets of wavelengths; polarization optics configured to provide wavelengths in the first set of wavelengths with a first polarization and wavelengths in the second set of wavelengths with a second polarization, the first and second polarizations being substantially orthogonal; a wavelength multiplexer configured to multiplex routed wavelengths with the first and second polarizations to produce pre-filtered, pair-wise orthogonal aggregate channel wavelengths; and a combined channel optical output port configured to output the pair-wise orthogonal aggregate channel wavelengths.

Consistent with another embodiment, an optical communication system includes: a transmitting terminal configured to transmit a wavelength division multiplexed (WDM) signal on a plurality of optical channels including a first set of channels and a second set of channels, the transmitting terminal comprising an orthogonally-combining wavelength selective switch (WSS) multiplexer configured to use wavelength selective switching to simultaneously pre-filter and combine a first set of channel wavelengths with a first polarization and a second set of channel wavelengths with a second polarization to produce a pre-filtered, pair-wise orthogonal aggregate optical signal, the first and second polarizations being substantially orthogonal; a receiving terminal configured to receive the pair-wise orthogonal WDM aggregate optical signal on the plurality of optical channels and configured to separate the WDM aggregate optical signal into separate optical signals at the channel wavelengths; and an optical transmission path coupling the transmitting terminal and the receiving terminal.

Consistent with a further embodiment, line terminating equipment includes: a plurality of odd channel transponders configured to transmit and receive optical signals modulated on odd channel wavelengths; a plurality of even channel transponders configured to transmit and receive optical signals modulated on even channel wavelengths; at least one odd channel wavelength multiplexer configured to combine the optical signals modulated on the odd channel wavelengths after the odd channel transponders to produce an aggregate odd channel transmit optical signal; at least one odd channel wavelength demultiplexer configured to separate received optical signals modulated on the odd channel wavelengths before the odd channel transponders; at least one even channel wavelength multiplexer configured to combine the optical signals modulated on the even channel wavelengths after the even channel transponders to produce an aggregate even channel transmit optical signal; at least one even channel wavelength demultiplexer configured to separate received optical signals modulated on the even channel wavelengths before the even channel transponders; and an orthogonally-combining WSS multiplexer configured to use wavelength selective switching to simultaneously pre-filter and combine the odd channel wavelengths from the aggregate odd channel optical signal with a first polarization and the even channel wavelengths from the aggregate even channel optical signal with a second polarization to produce a pre-filtered, pair-wise orthogonal aggregate transmit optical signal, the second polarization being substantially orthogonal to the first polarization.

Consistent with yet another embodiment, an optical transmission method includes: modulating a plurality of data streams on a first set of channel wavelengths and on a second set of channel wavelengths, respectively, to produce optical signals on respective first and second sets of channels; providing the optical signals on the first set of channels with a first polarization; providing the optical signals on the second set of channels with a second polarization substantially orthogonal to the first polarization; and simultaneously pre-filtering and combining the optical signals with the first polarization and the optical signals with the second polarization using wavelength selective switching to produce a pre-filtered, pair-wise orthogonal aggregate optical signal.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An orthogonally-combining wavelength selective switch (WSS) multiplexer comprising:
    first and second optical input ports configured to receive first and second sets of multiplexed wavelengths;
    first and second wavelength demultiplexers configured to demultiplex the first and second sets of multiplexed wavelengths, respectively;
    a switch fabric configured to selectively route wavelengths demultiplexed from the first and second sets of wavelengths;
    polarization optics configured to provide wavelengths in the first set of wavelengths with a first polarization and wavelengths in the second set of wavelengths with a second polarization, the first and second polarizations being substantially orthogonal;
    a wavelength multiplexer configured to multiplex routed wavelengths with the first and second polarizations to produce pre-filtered, pair-wise orthogonal aggregate channel wavelengths; and
    a combined channel optical output port configured to output the pair-wise orthogonal aggregate channel wavelengths.

2. The orthogonally-combining WSS multiplexer according to claim 1, wherein the first set of multiplexed wavelengths include odd channel wavelengths and the second set of multiplexed wavelengths include even channel wavelengths.

3. The orthogonally-combining WSS multiplexer according to claim 1, wherein the first optical input port and the second optical input port include fiber collimators coupled to polarization maintaining (PM) input fibers.

4. The orthogonally-combining WSS multiplexer according to claim 3 further comprising first and second input polarizers configured to increase a polarization extinction ratio of the first set of wavelengths and the second set of wavelengths, respectively.

5. The orthogonally-combining WSS multiplexer according to claim 1, further comprising a plurality of variable optical attenuators configured to adjust a power of the channel wavelengths, respectively, being routed by the switch fabric.

6. The orthogonally-combining WSS multiplexer according to claim 1, wherein the combined channel optical output includes a fiber collimator coupled to a PM output fiber.

7. The orthogonally-combining WSS multiplexer according to claim 1, wherein an angle between the first polarization and the second polarization is within a range of 90±7 degrees.

8. The orthogonally-combining WSS multiplexer according to claim 1, wherein the polarization optics are located after the switch fabric.

9. The orthogonally-combining WSS multiplexer according to claim 1, wherein the polarization optics are configured to translate the polarization of the channel wavelengths in either the first set of wavelengths or the second set of wavelengths by about 90 degrees.

10. The orthogonally-combining WSS multiplexer according to claim 1, wherein the polarization optics are configured to translate the polarization of the channel wavelengths in either the first set of wavelengths or the second set of wavelengths such that the first and second polarizations are substantially orthogonal or substantially parallel.

* * * * *